William L. Wilson
INVENTOR.

Aug. 26, 1958   W. L. WILSON   2,848,907
TRANSMISSION
Filed March 25, 1955   2 Sheets-Sheet 2
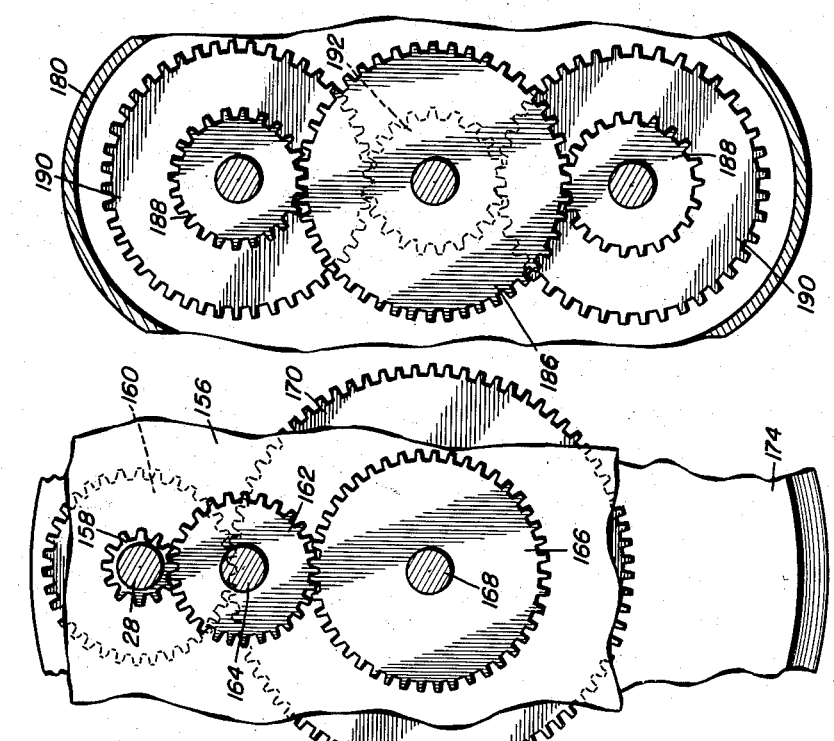
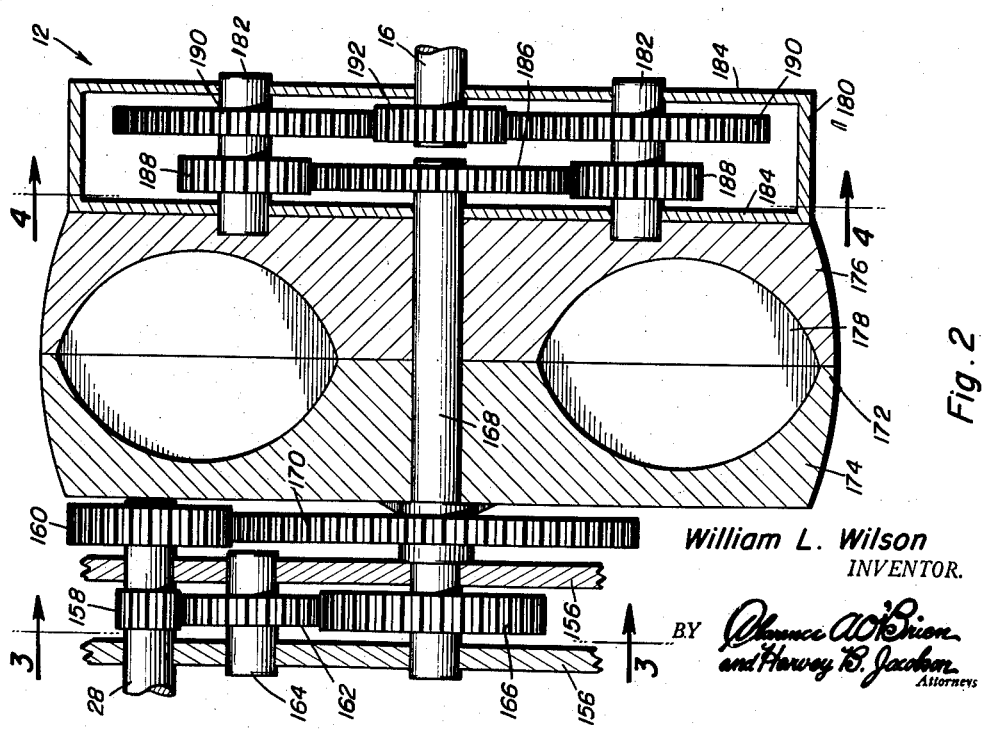
William L. Wilson
INVENTOR.

United States Patent Office 2,848,907
Patented Aug. 26, 1958

2,848,907

TRANSMISSION

William L. Wilson, Tiffen, Ohio

Application March 25, 1955, Serial No. 496,830

3 Claims. (Cl. 74—688)

This invention generally relates to an improved transmission and more specifically provides a device for transmitting power from a power source to a driven or propelling shaft at varying speeds and will find a specific adaptation in conjunction with an automotive vehicle.

An object of the present invention is to provide improved and novel construction in a transmission including a hydraulically operated reversing unit in combination with a gearing system for driving a propeller shaft of a vehicle at varying speeds to an engine output shaft and in either direction in relation thereto.

Another object of the present invention is to provide a transmission having a planetary type of reversing gear mechanism wherein by selective locking of the elements of the planetary gear arrangement, the output shaft therefrom may be rotated in forward or reverse direction in relation to the engine output shaft.

A further important object of the present invention is to provide a novel control means for a reversing mechanism utilized in conjunction with a transmission conformable to the preceding objects.

Yet another important feature of the present invention is the provision of a transmission including a gearing system incorporating a fluid clutch therein which operates to vary the relative rotational speeds of the output shaft from the reversing mechanism and the propeller shaft of the vehicle which is driven thereby so that an infinitely variable ratio is provided which will automatically adapt itself to the optimum ratio whether it be a reduction as the vehicle is initially set in motion or an overdrive after the vehicle has attained its cruising speed.

Other important objects of the present invention will reside in its simplicity of construction, efficiency in operation, automatically variable output speeds, adaptation for various purposes and its relatively inexpensive manufacturing and maintenance costs.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a sectional view through the gearing mechanism of the present invention showing the construction thereof in diagrammatic form;

Figure 3 is a vertical sectional view taken substantially upon a plane passing along section line 3—3 of Figure 2 showing the construction of the gearing mechanism forward of the fluid clutch; and Figure 4 is a vertical sectional view taken substantially upon a plane passing along section line 4—4 of Figure 2 showing the arrangement of gearing located rearwardly of the fluid clutch mechanism.

Figure 1:
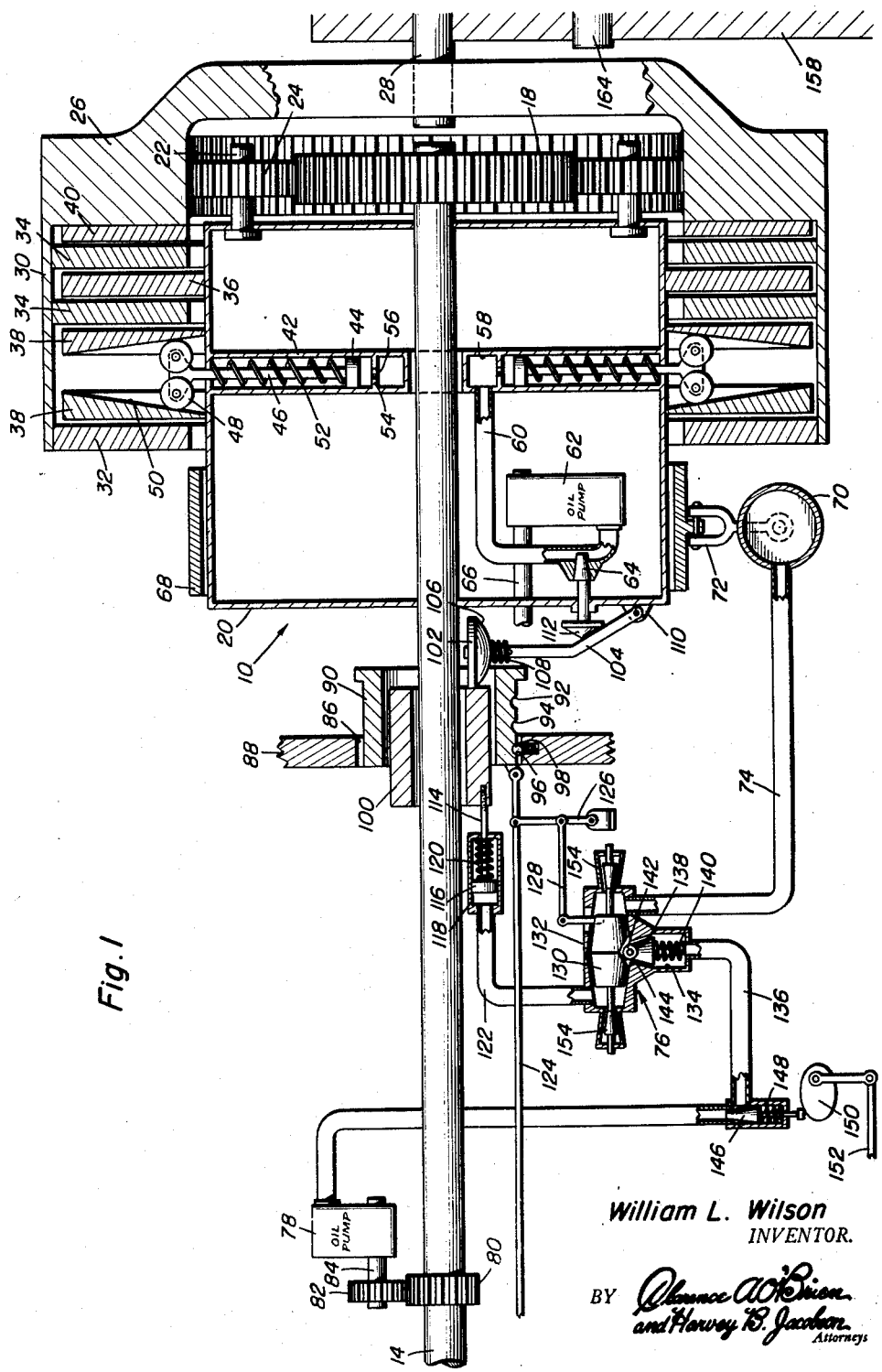
Figure 1 is a schematic sectional view showing the reversing gear mechanism showing diagrammatically the details of construction thereof.

Referring now specifically to the drawings, it will be seen that the numeral 10 generally designates the reversing mechanism and the numeral 12 generally designates the reduction gearing mechanism which unite to form a transmission for receiving power from an engine power shaft 14 which may be driven by any suitable engine and transmitting this power to a propeller shaft or a drive shaft 16 utilized for driving a vehicle or other suitable devices wherein the torque and rotation of the drive shaft 14 is transmitted to the propeller shaft 16 in variable relative speeds and in selective relative directions, thereby providing a transmission for use especially in conjunction with a vehicle having variable factors necessitating such variable ratios.

Referring now specifically to Figure 1 of the drawings, it will be seen that a drive gear 18 is mounted on the free end of the power shaft 14 and a generally hollow cylindrical carrier 20 is rotatably journaled on the power shaft 14 adjacent the drive gear 18 and the carrier 20 is provided with a plurality of stub axles 22 having idler or planet gears 24 mounted thereon in meshing engagement with the drive gear 18. Rotatably surrounding the carrier 20 is an enlarged internal gear 26 being supported by and driving an output shaft 28 which is in alignment with the power shaft 14. The internal gear 26 is in meshing engagement with the planet gears 24 and is driven thereby.

The internal gear 26 is provided with a laterally extending peripheral flange 30 having an inwardly extending peripheral flange 32 at its forward end and a pair of inwardly extending flanges 34 spaced therefrom and in mutual spaced relation. These flanges 32 and 34 are peripherally spaced from the periphery of the cylindrical planet carrier 20. The flanges 34 are slidably and nonrotatably attached to the flange 30 of the internal gear 26. Secured to the planet carrier 20 in spaced relation is a peripheral outwardly extending flange 36 disposed between the flanges 34 and a pair of spaced flanges 38 disposed between the flanges 32 and the forwardmost of the flanges 34. The flanges 36 and 38 are non-rotatably and slidably connected to the planet carrier 20 for longitudinal movement thereon into frictional clamping engagement with the flanges 34 and 32 on the internal gear 26. An annular member 40 may be provided for enhancing the frictional contact between the internal gear 26 and the flanges 36 on the carrier 20.

For expanding and contracting the flanges 38, the carrier 20 is provided with a plurality of radially extending cylinders 42 having a piston 44 slidably mounted therein together with a piston rod 46 extending outwardly therefrom and having a pair of rollers 48 on the outer end thereof in engagement with inclined facing cam surfaces 50 on the facing surfaces of the flanges 38 whereby radial movement of the piston 44 and the piston rod 46 will cause expansion and retraction of the flanges 38, thereby selectively locking the ring gear 26 to the planetary carrier 20. A compression coil spring 52 surrounds the piston rod 40 and abuts the underside of the piston 44 at one end thereof and the other end thereof abuts the periphery of the cylindrical carrier 20 for normally urging the piston 44 inwardly, thereby retracting the rollers 48 and retracting the flanges 38, thereby assuring that centrifugal force caused by the rotation of the carrier 20 will be counteracted, thereby assuring proper disengagement of the rollers 48 from the flanges 38, thereby assuring release of the internal gear 26 from the carrier 20. The inner end of the cylinder 42 is provided with a baffle 54 having a metering orifice 56 therein for generally providing a smooth movement for the piston 44 wherein the orifice 56 is in communication with an annular hollow member 58 which forms a pressure reservoir for the cylinders 42 wherein the pressure reservoir 58 is supplied by a fluid conduit 60 which, in turn, is connected to an oil pump 62 and provided with a control valve 64 therein. The oil pump 62 and provided with a control valve 64 therein. The oil pump 62 is driven by a shaft 66, as described hereinafter, and the valve 64 is actuated in a manner described hereinafter.

In order to lock the carrier 20 from rotation, a cylindrical friction type brake band 68 is provided in surrounding relation to one end of the cylindrical carrier 20, and the brake band 68 is split with the adjacent ends connected by a hydraulic piston and cylinder arrangement 70 that is connected to the brake band 68 by yoke members 72. The hydraulic piston and cylinder arrangement generally designated by the numeral 20 is connected to a fluid pressure line 74 connected through a valve mechanism generally designated by the numeral 76 to an oil pump 78 driven by a gear 80 on the power shaft 14 which is in meshing engagement with a gear 82 on the drive shaft 84 for the oil pump 78, thereby providing pressurized fluid to the cylinder 70 by use of the control mechanism 76, as described hereinafter.

It will be seen that selectively locking the internal gear to the carrier 20 will lock the idler gears or planet gears 24 to the internal gear 26 whereby the drive gear 18, idler gear 24 and internal gear 26 will rotate as a unit in one direction, thereby rotating the output shaft 28 in the same direction as the power shaft 14. When the internal gear 26 is released from the carrier 20 and the carrier 20 stopped by clamping the brake band 68 therearound, the drive gear 18 will rotate in the same direction as the power shaft 14, thereby rotating the planet gears 24 in the opposite direction and also rotating the internal gear 26 in the same direction as the planet gears 24, thereby rotating the output shaft 28 in the direction opposite in rotation to the power shaft 14 wherein a reversing gear mechanism is provided for selectively driving the output shaft 28 in the same direction or in the opposite direction as the power shaft 14. It will be understood that the entire reversing gear mechanism will be enclosed in a housing or casing, not illustrated, and it will also be understood that the usual and necessary bearings and similar structural details are not illustrated since the principles of the invention are more clearly shown and understood without the inclusion of such structural details which will be determined by the structural and engineering requirements of the device.

Mounted in an aperture 86 in the web 88 which may be disposed in the bellhousing of the transmission (not shown) is slidably and non-rotatably mounted an external sleeve 90 having three spaced semispherical identations 92, 94 and 96 therein for receiving a spring urged spherical ball 98 mounted in the web 88 whereby the sleeve 90 will be retained in adjusted position longitudinally of the power shaft 14. Mounted internally of the external sleeve 90 is a slidable and non-rotatable internal sleeve 100 which engages a roller 102 rotatably mounted on the free end of an actuating arm 104. The roller 102 is provided with a convex lower surface 106 and a compression spring 108 for urging the roller 102 towards the center of the power shaft 14. The arm 104 is pivotally attached to lugs 110 on the planet carrier 20 and is in engagement with an operating head 112 of the control valve 64 for the oil pump 62 which will control admission of oil pressure into the radial cylinders 42, thereby controlling the forward driving motion of the reversing mechanism 10. The internal sleeve 100 is attached to a piston rod 114 having a piston 116 on the inner end thereof which is slidably received in a cylinder 118 and a compression coil spring 120 is disposed between the piston 116 and the end of the cylinder 118 adjacent the internal sleeve 100, thereby continuously urging the sleeve 100 away from the roller 102. A fluid pressure line 122 interconnects the cylinder 118 to the fluid control valve 76 for actuation of the piston 116 and the internal sleeve 100 as set forth hereinafter. The external sleeve 90 is pivotally connected to an actuating link 124 which is connected to a selector lever (not shown) that is remotely positioned, such as in the vehicle passenger compartment. The linkage 124 is connected to a pivotal lever 126 having an arm 128 attached thereto which is rigidly connected to the barrel-shaped plug 130 of a barrel control valve housing 132. The conduit 122 is in communication with the interior of the casing 132 at one end thereof and the conduit 74 is in communication with the casing 132 at the other end thereof and an inlet 134 is provided at the bottom of the casing 132 which is communicated with a fluid conduit 136. A spring urged valve member 138 is provided in the inlet 134 and is urged towards a closed position by a compression spring 140 and a roller 142 is provided on the upper end of the valve 138 for engagement with a V-shaped cam notch 144 in the valve plug 130 wherein the valve 138 will be opened during movement of the valve plug 130 away from its central position, thereby selectively admitting pressure from the conduit 136 into the conduit 122 or the conduit 74. A regulator valve 146 is provided in the fluid conduit 136 which is spring urged by compression spring 148 and controlled by a cam member 150 which is actuated by a rod 152 connected to the accelerator linkage of the vehicle whereby the valve 146 will be closed when the accelerator of the vehicle is not depressed. Relief valves 154 on each end of the barrel casing 132 will permit relief of any pressure that may leak by the valve plug 130 when in its neutral position so that neither the piston 44 will be urged outwardly nor the piston and cylinder arrangement 70 will be actuated, thereby permitting free rotation of the internal gear 26 and the carrier 20, thereby permitting the output shaft 28 to remain stationary during rotation of the power shaft 14.

When the selector lever connected to the link 124 is moved to a forward position, the external sleeve 90 is moved forwardly or to the right, as illustrated in Figure 1, thereby moving the plug valve 130 to the right for opening the valve 130 in the conduit 136 thereby admitting fluid pressure through the conduit 122 into the cylinder 118 and urging the piston 116 and piston rod 118 to the right, thereby urging the internal sleeve 100 to the right which will open the valve 64, thereby permitting oil pressure from the pump 62 into the conduit 60 and into the annular cylinder 58 and the radial cylinders 42, thereby urging the radial piston rods 46 outwardly, thereby expanding the flanges 38 and locking the carrier 20 to the internal gear 26 for rotating the output shaft in the same direction as the power shaft 14 so that the vehicle will be driven in a forward direction. When the selector lever is moved and the rod 124 actuated so that the ball detent 98 is in the central recess 94, the plug valve 130 is in its neutral position with both the conduits 122 and 74 closed, whereby both the carrier 20 and the internal gear 26 will rotate freely, thereby permitting the power shaft 14 to rotate and the output shaft 28 to stand still. When the selector lever moves the rod 124 to a reverse position, the detent 98 is positioned in the recess 92, thereby moving the plug valve 130 to the left, thereby opening the valve 138 and admitting pressure into the conduit 74 thereby locking the brake band to the carrier 20 for locking the planet carrier 20 thereby causing the internal gear 26 to be rotated in a reverse direction in relation to the power shaft 14, thereby rotating the output shaft 28 in a reverse direction.

It is noted that the concave roller 102 is moved by the internal sleeve 100, and when centrifugal force exerts its pressure on the roller 102, it will move from the internal sleeve 100 into engagement with the external sleeve 90, and due to the action of centrifugal force, the concave surface 106 of the roller 102 will be retained in contact with the external sleeve 90 when the vehicle is slowing down, thereby preventing the release of the clutch or reversing mechanism 10, thereby assuring that the engine of a vehicle may be utilized as an effective brake during deceleration of the vehicle. Also, it will be understood that the cam member 150 retains the valve 146 in closed position when the accelerator is not depressed, thereby eliminating fluid pressure to the control valve 76, thereby permitting the vehicle to idle with the selector lever in any position without the tendency of the vehicle to creep, since the valve 146 will not be opened until the accelerator pedal is depressed and the pressure exerted by the oil pump overcomes the pressure of the spring 148.

Referring now specifically to Figures 2–4 of the drawings, the speed varying mechanism 12 is illustrated with an input shaft 28 which is the same shaft as the ouput shaft 28 of the reversing or clutching mechanism 10. The speed varying mechanism 12 is utilized for driving the propeller shaft 16 at varying speeds for propelling the vehicle in the usual manner.

The input shaft 28 is journaled in web members 156 and includes a pair of gears 158 and 160 thereon wherein the gear 158 is much smaller than the gear 160. The gear 158 is in meshing engagement with an adler gear 162 mounted on a supporting shaft 164 and the idler gear 162 is in meshing engagement with a gear 166 mounted on a central shaft 168, whereby the shaft 168 will be rotated in the same direction as the input shaft 28 at a reduced speed. The gear 160 on the end of the input shaft 28 is in meshing engagement with a large gear 170 rotatably journaled on the central shaft 168. Also rotatably mounted on the central shaft 168 is a fluid clutch mechanism generally designated by the numeral 172 which includes a front torus member 174 and a rear torus member 176 together with fluid coupling surfaces 178 in the facing surfaces thereof. The front torus member 174 is rigidly secured to the gear 170 for rotation therewith whereby the front torus member 174 will rotate in a direction opposite to the direction of rotation of the input shaft 28 and the central shaft 168.

Secured to the rear surface of the rear torus member 176 is a casing 180 which has a pair of stub shafts 182 mounted therein and extending between the side walls 184 of the casing 180. Rigidly secured to the rear end of the central shaft 168 is a central gear 186 which is in meshing engagement with an inner pair of gears 188 mounted on the stub shaft 182. Also mounted on the stub shaft 182 is an outer pair of gears 190 that are in meshing engagement with a propeller gear 192 mounted on the propeller shaft 16. It will be noted that the inner pair of gears 188 are substantially smaller than the outer pair of gears 190 and the propeller gear 192 is substantially smaller than the gear 186 on the central shaft 168 thereby giving the desired reduction in speed.

When the input shaft 28 begins rotation, as when the vehicle is started, the central shaft 168 will be rotated in the same direction as the input shaft 28, thereby rotating the central gear 186 in the same direction. The front torus member 174 which is attached to the gear 170 will be rotated in an opposite direction from the central shaft 168 and the central gear 186. The rotation of the central gear 186 will rotate the shafts 182 together with the gears 188 and 190 thereon in the opposite direction which will rotate the propelling gear 192 in the same direction as the central gear 186. However, since the load is on the propeller shaft 16 and resists the rotation thereof, the rear torus member 176 will be rotated in the same direction as the central gear 186 and shaft 168 since the shafts 182 will revolve about the center of the central shaft 168 and the propeller shaft 16 since the gears 188 and 190 are in meshing engagement with the central gear 186 and the propelling gear 192. This will provide the maximum reduction of the rotational speed of the shaft 28 to the shaft 16, thereby providing a relatively high torque for starting the vehicle driving wheels and also providing a smooth power source.

As the speed of the input shaft 28 increases, the fluid clutch 172 will begin to reduce the relative rotation between the front torus member 174 and the rear torus member 176 thereby reducing the revolving movement of the stub shafts 182. It will be understood that when the stub shafts 182 revolve around the gear 186, the rotational speed of the stub shafts 182 and the gears 188 and 190 will be reduced. As the revolving movement of the stub shafts 182 is reduced, the rotational speed of the stub shafts 182 will gradually increase, thereby increasing the speed of the gears 188 and 190 and increasing the speed of the propeller shaft 16.

As the speed of the input shaft 28 further increases, the front torus member will gradually turn the rear torus member 176 in the same direction wherein the stub shafts 182 will revolve in the opposite direction about the central shaft 168 which will be in the opposite direction of rotation of the central gear 186. Since the gears 188 are now being revolved about the central gear 186 in a direction opposite to the rotation of the gear 186, the rotational speed of the gears 188 and the stub shafts 182 will be further increased. This, of course, will further increase the speed of the outer pair of gears 190 and the propelling gear 192, thereby increasing the speed of the propeller shaft 16 for increasing the speed of the vehicle. When the front and rear torus members 174 and 176 lock up and rotate as a unit in a direction opposite to the rotation of the central shaft 168, the shaft 16 will be rotating at its highest speed. The lower speed of the shaft 16 is caused when the front torus member 174 and the rear torus member 176 are rotating in opposite directions and the lower speed occurs when the greatest relative rotation between the front and rear torus members occurs. Conversely, the high speed occurs when the least relative rotation between the front torus member 174 and the rear torus member 176 occurs.

It will be understood that the various relative speeds between the various gears and the relative size may be varied, depending upon the particular type of installation and the particular needs of the installation. Further, it will be understood that the various bearings and other necessary structural details for the efficient operation of the invention have been omitted since only the principal structure is illustrated.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claims.

What is claimed as new is as follows:

1. A power transmission comprising a gearing system interconnecting the output shaft of a reversing mechanism with a propeller shaft, said gearing system interconnecting the output shaft and the propelling shaft including a pair of longitudinal spaced drive gears of unequal size mounted on the output shaft, a freely rotatable idler gear in meshing engagement with the smaller of said spaced gears, a pair of spaced unequal driven gears in meshing engagement with said free idler gear and the other of said spaced gears, respectively, for rotation of said driven gears in opposite directions, one of said driven gears being secured to a central shaft and the other of said driven gears being rotatably mounted on said central shaft in alignment with the other of said spaced drive gears, a central gear mounted on the other end of said central shaft, a fluid clutch including a pair of torus members rotatably mounted on said central shaft with the forward torus being secured to said other of said driven gears, and the rear torus rotatably supporting a pair of stub shafts, each of said stub shafts having a pair of inner and outer gears thereon with the inner gears in meshing engagement with the central gear, and a propelling shaft gear secured to the propelling shaft in meshing engagement with the outer pair of gears mounted on the stub shafts for driving the propelling shaft at varying speeds.

2. The combination of claim 1 wherein said front torus rotates in an opposite direction to said central shaft and the rear torus when the propeller is moving slowly, the relative rotational movement between said torus members gradually reducing through the fluid clutch for rotating both torus members at an equal speed in an opposite direction of rotation from the central shaft and central gear thereby revolving the stub shafts about the central gear in the opposite rotational direction thereby increasing the rotational speed of the stub shafts and the propelling shaft.

3. The combination of claim 2 wherein said outer pair of gears on the stub shafts are larger than the inner pair whereby the revolving of the outer pair of gears about the propelling shaft gear will give an infinitely variable ratio of speed between the propelling shaft and the output shaft dependent upon the relative rotation between the torus members.

References Cited in the file of this patent

UNITED STATES PATENTS

| | | |
|---|---|---|
| 1,767,933 | Ledwell | June 24, 1930 |
| 2,326,570 | Schaefer et al. | Aug. 10, 1943 |
| 2,373,122 | La Brie | Apr. 10, 1945 |
| 2,693,260 | Lucia | Nov. 2, 1954 |